United States Patent [19]

Schweitzer et al.

[11] 4,284,851

[45] Aug. 18, 1981

[54] ARRANGEMENT FOR FRUSTRATING FRAUDULENT TELEPHONE CALLS

[75] Inventors: Philip F. Schweitzer, Colts Neck; John R. Shine, Rumson, both of N.J.

[73] Assignee: Bell Telephone Laboratories, Incorporated, Murray Hill, N.J.

[21] Appl. No.: 53,395

[22] Filed: Jun. 29, 1979

[51] Int. Cl.³ ............................................. H04M 1/66
[52] U.S. Cl. ........................... 179/18 DA; 179/84 VF
[58] Field of Search .......... 179/18 DA, 27 CB, 27 G, 179/90 D, 7.1 R, 7 R, 84 VF

[56] References Cited

U.S. PATENT DOCUMENTS

| | | | |
|---|---|---|---|
| 3,569,634 | 3/1971 | Amadasi et al. | 179/18 DA |
| 3,588,374 | 6/1971 | Van Hensbergen | 179/84 VF |
| 3,952,160 | 4/1976 | Pasternack et al. | 179/7.1 R |
| 4,001,513 | 1/1977 | Naylor | 179/18 DA |
| 4,002,848 | 1/1977 | Stein | 179/18 DA |
| 4,018,996 | 4/1977 | Kahn | 179/84 VF |
| 4,056,698 | 11/1977 | Dworak et al. | 179/175.2 C |
| 4,147,902 | 4/1979 | Dworak | 179/175.2 R |

Primary Examiner—Thomas W. Brown
Attorney, Agent, or Firm—Charles H. Davis

[57] ABSTRACT

A method and arrangement for frustrating attempted fraudulent calls from a station using a "blue box" device to avoid toll charges. Upon detecting a possible fraudulent call, the sequence of digits from the blue box is altered to divert the call from its intended destination. Specifically, "KEY PULSE" and "START PULSE" tones are generated and commingled with the digits from the blue box to route the call to reorder.

14 Claims, 5 Drawing Figures

TIMING DIAGRAM

ARRANGEMENT FOR FRUSTRATING FRAUDULENT TELEPHONE CALLS

TECHNICAL FIELD

This invention relates to telephone systems and particularly to arrangements for detecting irregular calls. More specifically, this invention relates to a method and apparatus for identifying and frustrating fraudulent toll calls.

BACKGROUND ART

It is generally known that telephone service is sometimes abused by persons making fraudulent calls, that is, calls that cannot be billed properly. One method of placing a fraudulent call involves the use of the so-called "blue box" device. The blue box device permits a calling party to simulate in-band supervisory signals and multifrequency tones which are normally generated by the switching equipment to direct calls through the toll network. The blue box user generally places an inexpensive toll call to a nearby destination or a call to a toll free number. At the appropriate time, when the message billing equipment is waiting for an answer signal from the destination office, the caller transmits a disconnect signal to the destination toll office. In response to the signal, the destination office abandons the call in progress. When the blue box user removes the signal, it is interpreted at the destination toll office as a new request for service. The destination office attaches a register-sender to the connection and returns a "proceed-to-send" or "delay dial" signal towards the calling party. The blue box caller can now key in a new number and direct this second call anywhere in the toll network. The message billing equipment is unaware of the second call and charges the calling customer on the basis of the inexpensive or free call to the first number.

Attempts have been made to detect calls from a blue box user. In one known arrangement, as disclosed in U.S. Pat. No. 4,001,513 to D. C. Naylor of Jan. 4, 1977, the second "proceed-to-send" signal is recognized at the time when answer supervision is normally expected from the called customer. In this arrangement, a multifrequency receiver is coupled to the connection to record the tones transmitted by the calling customer's blue box.

While the Naylor arrangement is wholly suitable for its intended purpose, there are no provisions set forth therein for blocking the fraudulent call from completion.

Another known arrangement of fraud detection which blocks the establishment of the fraudulent call is disclosed in U.S. Pat. No. 4,002,848 to R. P. Stein of Jan. 11, 1977. In the Stein disclosure tone detectors are coupled to the connection at a point where in-band supervisory signals are not normally present. Thus, if a single frequency supervisory signal is present, the call is presumed to be a fraudulent call and the sleeve lead of the connection is opened to release the switch train.

While the Stein arrangement prevents the completion of the fraudulent call, it requires that all lines be scanned looking for the tones generated by the blue box. In addition, once having detected a fraudulent call, the connection is abruptly interrupted and the calling party may be made aware that his fraudulent call has been detected.

Accordingly, a need exists in the prior art for a more efficient arrangement for detecting and frustrating fraudulent toll calls while minimizing the risk of warning the fraud perpetrator.

SUMMARY OF THE INVENTION

The foregoing problem is solved and a technical advance is achieved by an arrangement which automatically detects a fraudulent call in progress and mutilates the digit sequence which is transmitted by the blue box toward the destination toll office. The switching equipment at the destination toll office responds to the mutilated, and therefore, invalid, digit sequence by routing the call to reorder in a conventional manner.

More specifically, the near-end switching equipment recognizes the fraudulent call by the improper sequence of supervisory signals and then monitors the call for the multifrequency tones being transmitted by the blue box user. In accordance with one feature of the invention, additional tones are then commingled with the blue box tones causing an invalid digit sequence. The common control equipment at the terminating toll office recognizes the invalid digit sequence and routes the call to a reorder tone trunk.

BRIEF DESCRIPTION OF THE DRAWING

FIG. 3 shows the arrangement of FIGS. 1 and 2;

DETAILED DESCRIPTION

Figure 1:
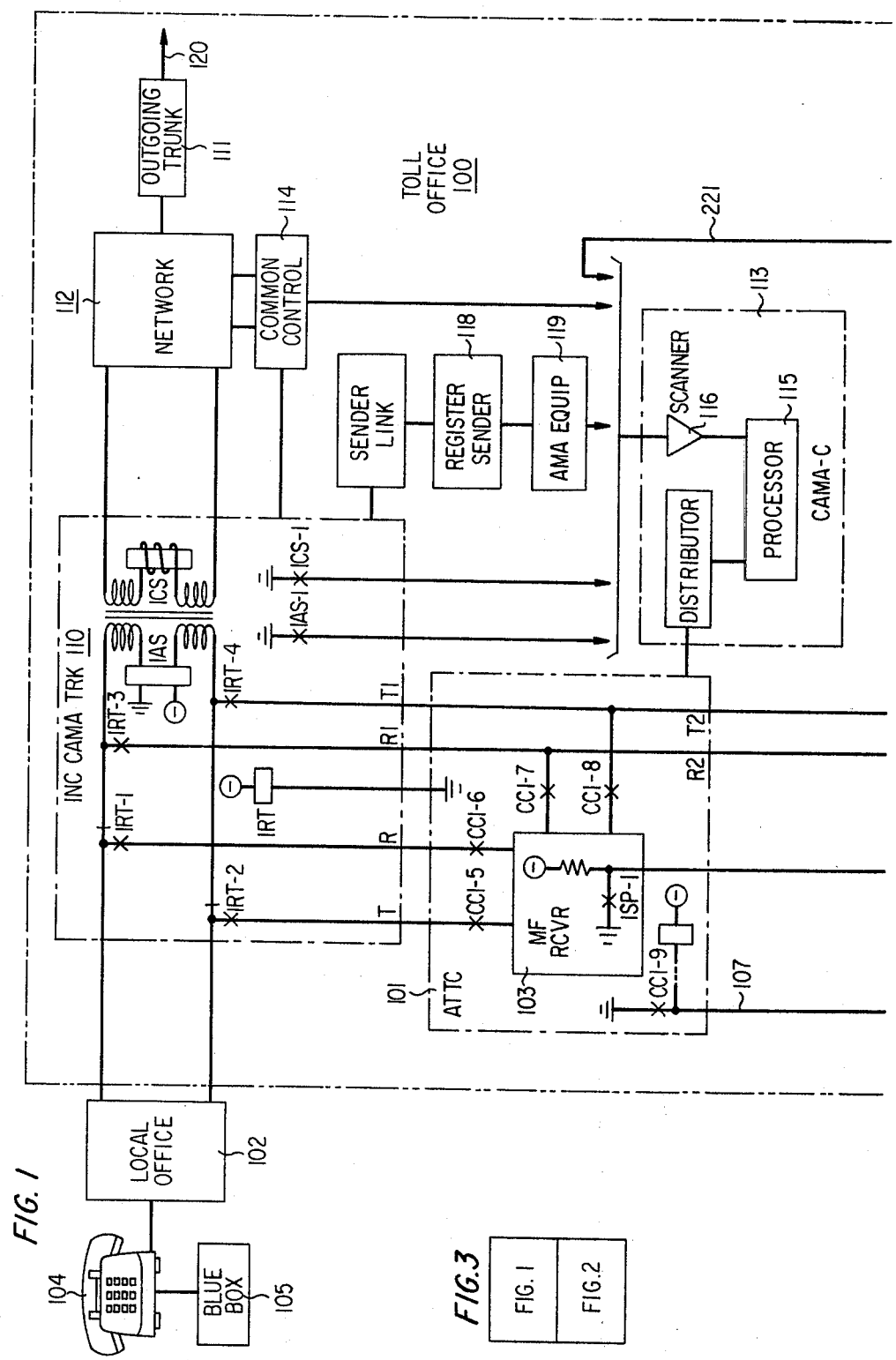
FIG. 1 shows a block diagram of a portion of a telephone system employing the invention.
Figure 2:
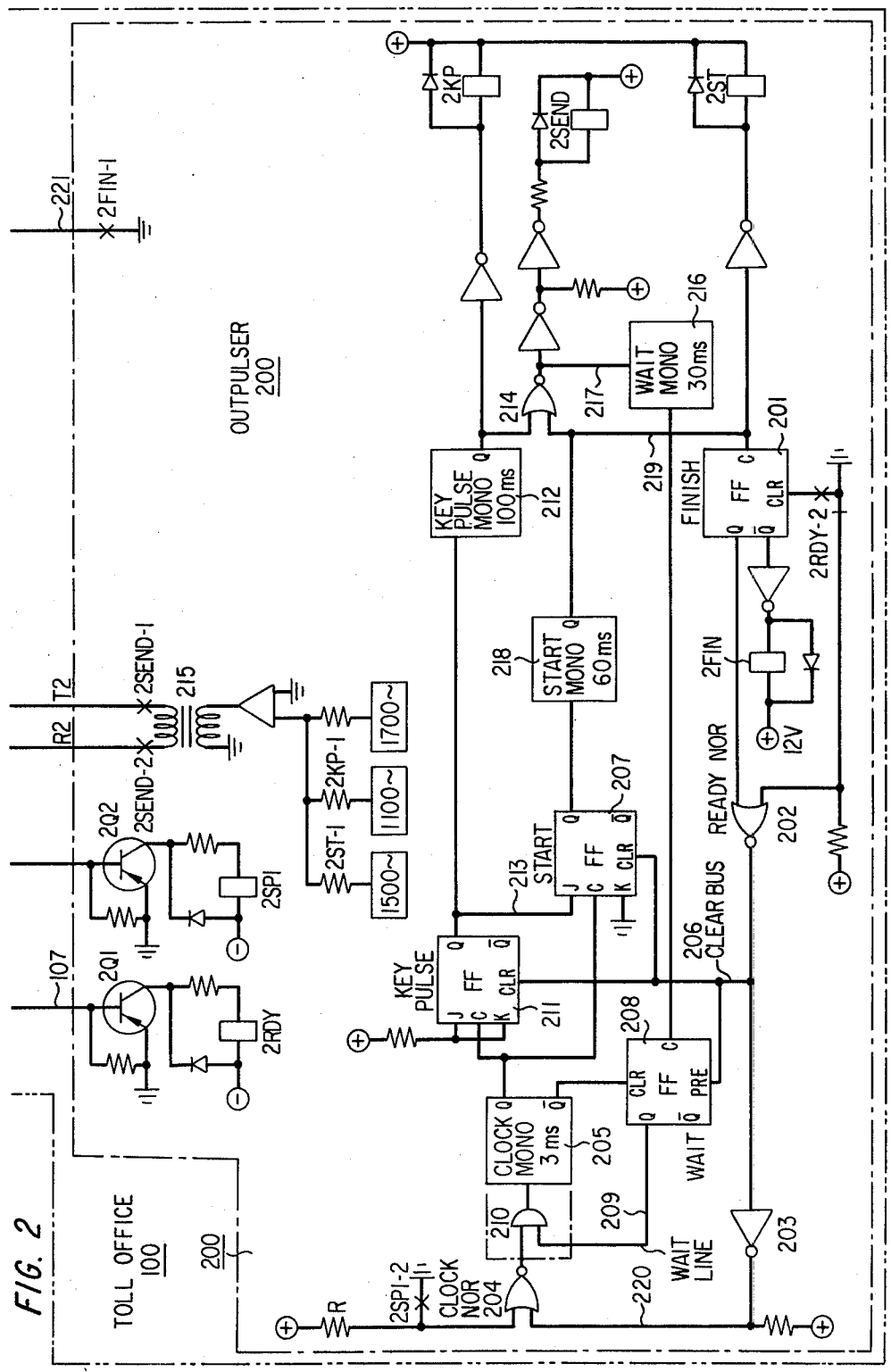
FIG. 2 is a schematic diagram of a typical outpulser used in the invention.

FIGS. 1 and 2, when arranged according to FIG. 3, show a portion of typical telephone network embodying the invention. Only those portions of the system necessary for an understanding of the invention are shown and the equipment units represented in block diagram form are well-known by persons skilled in the art. FIG. 1 shows toll office 100 which serves many local switching offices, such as local office 102. Local office 102, in turn, serves the customer stations such as station 104. The toll office 100 in FIG. 1 comprises a plurality of incoming trunks such as 110 and outgoing trunks, such as 111 which are interconnected over network 112 under the control of common control equipment 114. Toll office 100 also comprises centralized automatic message accounting equipment 113 which is used to assemble the call billing information for the surrounding local offices served by the toll office. Of course, the invention disclosed herein could also be used with automatic message accounting systems which are located at the local office.

Message accounting system 113 comprises a stored program controlled processor 115 which gathers billing data via scanner 116. Processor 115 obtains the details of the call, such as the calling and called line identities, from register-sender 118 and automatic message accounting equipment 119. The calling and called supervisory states of the call are monitored by the processor directly at incoming trunk 110 via scanner 116.

The customer initiates a long distance toll call in the conventional manner by lifting his receiver at station 104 and dialing the telephone number of the desired party. If a blue box fraud call is to be made, the customer at station 104 would usually dial a nearby toll call to establish an inexpensive charging base or the customer might dial one of the toll free numbers.

In the example being described, the local office 102 determines that the routing of the call should be via toll office 100 and selects trunk 110. Register-sender 118 is connected to the trunk and local office 102 outpulses the called number and the calling number into register-sender 118.

At toll office 100, common control equipment 114 examines the called number and determines that the call must be forwarded via outgoing trunk 111. A seizure signal is forwarded over outgoing trunk 111 and the seizure signal at office 100 causes in-band signaling tone to be removed from transmission path 120 to the incoming trunk at the distant office. The incoming trunk at the distant office bids for connection to register-sender thereat, and when a register-sender is attached to the trunk, a "proceed-to-send" or "delay dial" signal is returned to office 100 via transmission path 120 informing register-sender 118 at the near-end office 100 that register-sender 118 can outpulse the called number to the destination office.

As mentioned above, the message billing function for the call being described is performed at toll office 100 by AMA equipment 119 and CAMA-C equipment 113. Initial entry data, such as the calling number, called number, incoming CAMA trunk number, and miscellaneous billing information are received by processor 115 via AMA equipment 119 and scanner 116, while answer and disconnect supervisory indications are received directly from the trunk via scanner 116. Thus, all trunks are periodically scanned to determine the current state of their calling and called supervisory relays 1AS and 1CS, respectively. The current state of these relays is compared with the state recorded on a previous scan and if a change of state occurs, appropriate action is taken.

If the customer at station 104 wishes to establish a fraud call using the blue box device 105, the customer activates the device prior to an answer signal from the called line. By activating his blue box at this time and simulating an in-band signaling disconnect, the connection is released beyond toll office 100 to the called customer station. The connection from calling station 104 to outgoing trunk 111 remains established, nevertheless, under control of the DC supervision on this portion of the connection which is controlled by the calling station. Up to this point, the automatic message accounting equipment 119 had recorded an initial entry and was waiting for called party answer supervision.

The customer at station 104 now removes the single frequency disconnect tone from his line and this is interpreted by the distant terminating office as a new request for service. The trunk at the distant office bids once again for a register-sender thereat. When the register-sender is attached to the trunk and the register-sender is ready to receive the called number, a "proceed-to-send" or "delay dial" signal is once again returned to toll office 100. At this time, however, register-sender 118 is not attached to trunk 110 and will not respond to the second "proceed-to-send" or "delay dial" signal. Because the "proceed-to-send" or "delay dial" signals ae not returned to the calling station, the customer at station 104 normally waits a short period of time after removing the single frequency before using his blue box to key-in multifrequency control signals and thereby direct his call to a new called party. If toll office 100 is not equipped to detect blue box fraud calls, the office ignores the momentary signal received from the terminating office when a register-sender was reconnected to the far end of trunk 111, since this signal was too short in duration to signify a valid answer. When the telephone station of the new called number answers, however, a charging condition will be established in the trunk and an answer entry will be made by the CAMA-C equipment at toll office 100. Of course, the calling party will be charged at a rate according to the first number dialed which may have been a free call or a less expensive toll call.

Toll office 100 is arranged to detect a pattern of supervisory signals that are suspicious and indicative of blue box type fraud calls. The manner in which the suspected fraud call is detected is well-known in the art and set forth in the above cited Naylor patent and in a copending application of C. T. Keys and R. A. Ratti, Ser. No. 945,810, filed Sept. 26, 1978, now U.S. Pat. No. 4,182,934. As noted in these references, trunk 110 is scanned and if a second "proceed-to-send" or "delay dial" signal is received from the terminating office, steps ae taken at toll office 100 to ascertain if this is a blue box fraud call.

In the system described herein, the processor gains access to the transmission conductors of trunk 110 via automatic trunk test circuit 101 similar to the arrangement described in U.S. Pat. No. 4,056,698 to F. S. Dworak et al of Nov. 1, 1977. As shown in FIG. 1 of the present disclosure, the transmission path between the calling and called customers is split by relay 1RT and relay 1RT is operated by the automatic trunk test circuit 101 in a conventional manner as shown in the Dworak et al patent.

In operating, relay 1RT closes its contacts 1RT-1 through 1RT-4 and extends the T,R, R1, and T1 conductors to multifrequency receiver 103 in automatic trunk test circuit 101. Furthermore, the called customer transmission conductors T1 and R1 are extended over conductors T2 and R2 to outpulser 200 in FIG. 2. Outpulser 200 will control the outpulsing of the invalid sequence of digits to the terminating office as described below. Although the transmission path of trunk 110 is split for connection to the automatic trunk test circuit, any multifrequency tones transmitted by the blue box will pass through the multifrequency circuit 103 and be transmitted to the terminating office.

When automatic trunk test circuit 101 operates its relay CCI as set forth in the aforementioned Dworak et al patent, a signal is transmitted over conductor 107 to FIG. 2 to turn off transistor 2Q1. When transistor 2Q1 turns off, relay 2RDY releases to initialize outpulser 200.

Figure 4:
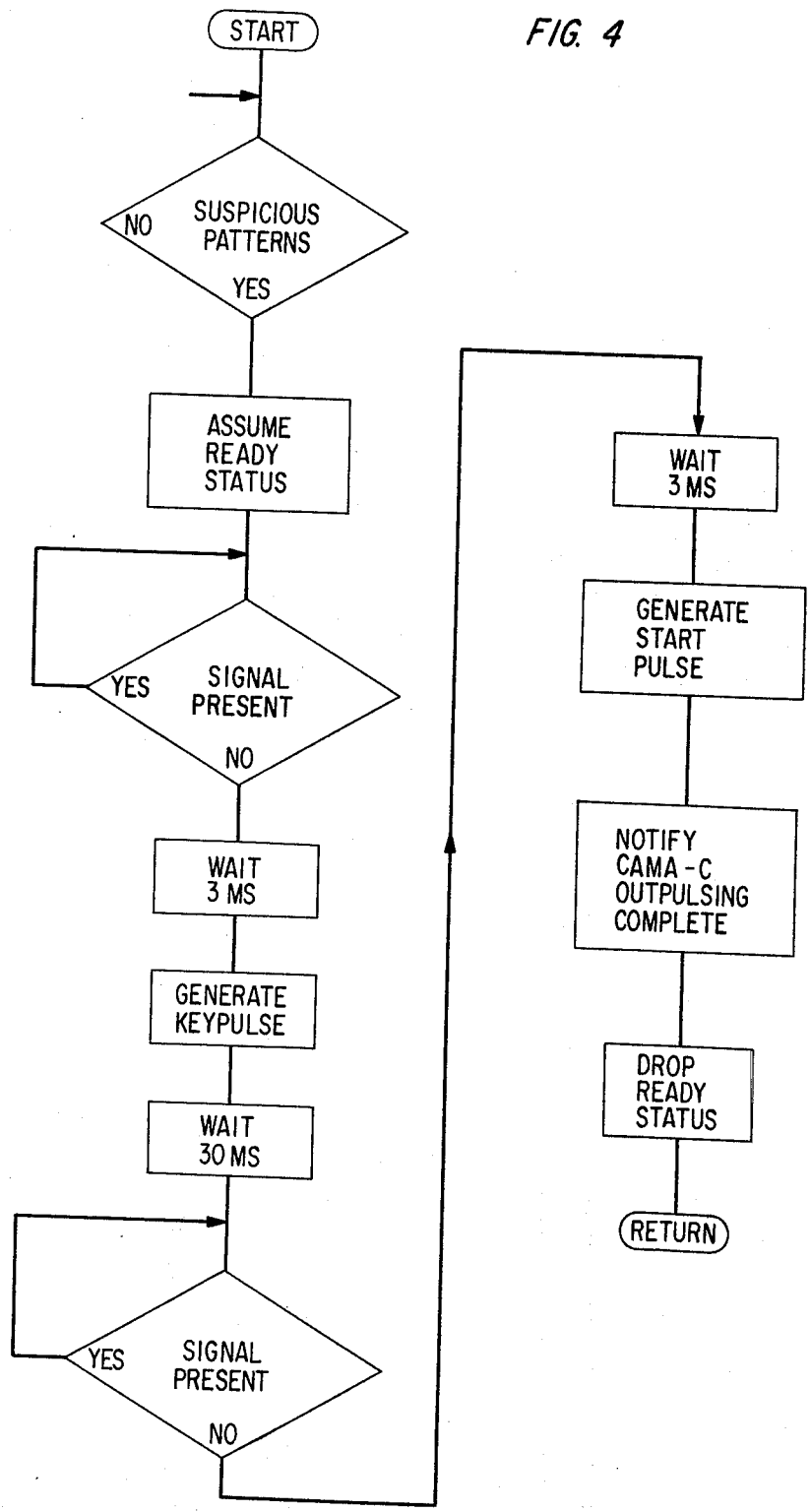
FIG. 4 shows a flow diagram of the sequence of operation of the system in frustrating a fraudulent call.

The overall sequence of operation of the proposed system is set forth in the flow chart of FIG. 4. Up to this point in the sequence of operations, the processor has detected a sequence of suspicious supervisory signaling patterns indicating that a possible fraudulent call is in progress. The processor activated the automatic trunk test circuit to couple a multifrequency receiver to the transmission path of the trunk and the automatic trunk test circuit caused on outpulser to assume a "ready" status.

As is well-known in the prior art, multifrequency pulsing comprises a series of signals wherein each signal contains two-out-of-six frequencies. The initial signal called a KEY PULSE signal includes the frequencies 1100 HZ and 1700 HZ and is transmitted to the receiver in the register-sender at the terminating office indicating the beginning of the called number which will follow. The called number (which may contain an area code, an office code, and the called customer's telephone number) is then sent one digit at a time using various combinations of two frequencies from the group 700 HZ, 900 HZ, 1100 HZ, 1300 HZ and 1500 HZ. When all digits have been sent, a START PULSE signal comprising the frequencies 1500 HZ and 1700 HZ is transmitted. The START PULSE indicates to the terminating office register-sender that all digits have been sent and the terminating office can begin processing the call.

At the terminating office, the digits appearing between the KEY PULSE signal and the START PULSE signal are translated and the call is routed to the proper destination. As is well-known in the prior art, if the terminating office cannot properly translate these digits it disposes of the call by routing the call to a reorder trunk.

As set forth in the flow diagram of FIG. 4, after the outpulser has been initialized, multifrequency receiver 103 is monitored for the presence of tone and outpulser 200 is inhibited until all tones coming from the blue box are absent for a prescribed interval. This feature safeguards the apparatus from malfunctioning if the blue box user attempts to override the signals from outpulser 200.

More specifically, many terminating office register-senders are designed to ignore multifrequency signals that occur in too rapid succession. This avoids registering the same digit twice if there is a momentary hit on the line which interrupts the digit during its transmittal. The register-senders have built-in timing apparatus that requires all multifrequency tones be absent for a minimum interval before the next digit will be accepted.

Thus, if the outpulser were not responsive to the absence of multifrequency tones on the line, the blue box user could send a continuous multifrequency tone while outpulser 200 was outpulsing and the invalid digit sequence would not be registered at the terminating office.

When outpulser 200 is sure that no multifrequency signals are present from the blue box, it waits 3 milliseconds and outpulses a KEY PULSE signal. The outpulser then times a 30 millisecond interval and monitors receiver 103 to ascertain if the blue box user has transmitted another digit. If there is no other multifrequency signal present on the line from the blue box, outpulser 200 transmits a START PULSE signal to the terminating office register-sender as set forth in FIG. 4.

As mentioned above, the appearance of KEY PULSE and START PULSE commingled with the digits transmitted by the blue box will be translated at the terminating office as an invalid digit sequence. Accordingly, the call will be routed to reorder.

After transmitting the START PULSE, outpulser 200 signals the CAMA-C processor 115 that it has completed operation and the outpulser restores to normal. Processor 115 restores the automatic trunk test circuit to normal, exits the program subroutine shown in the flow diagram of FIG. 4 and returns to processing other calls in the conventional manner.

Figure 5:
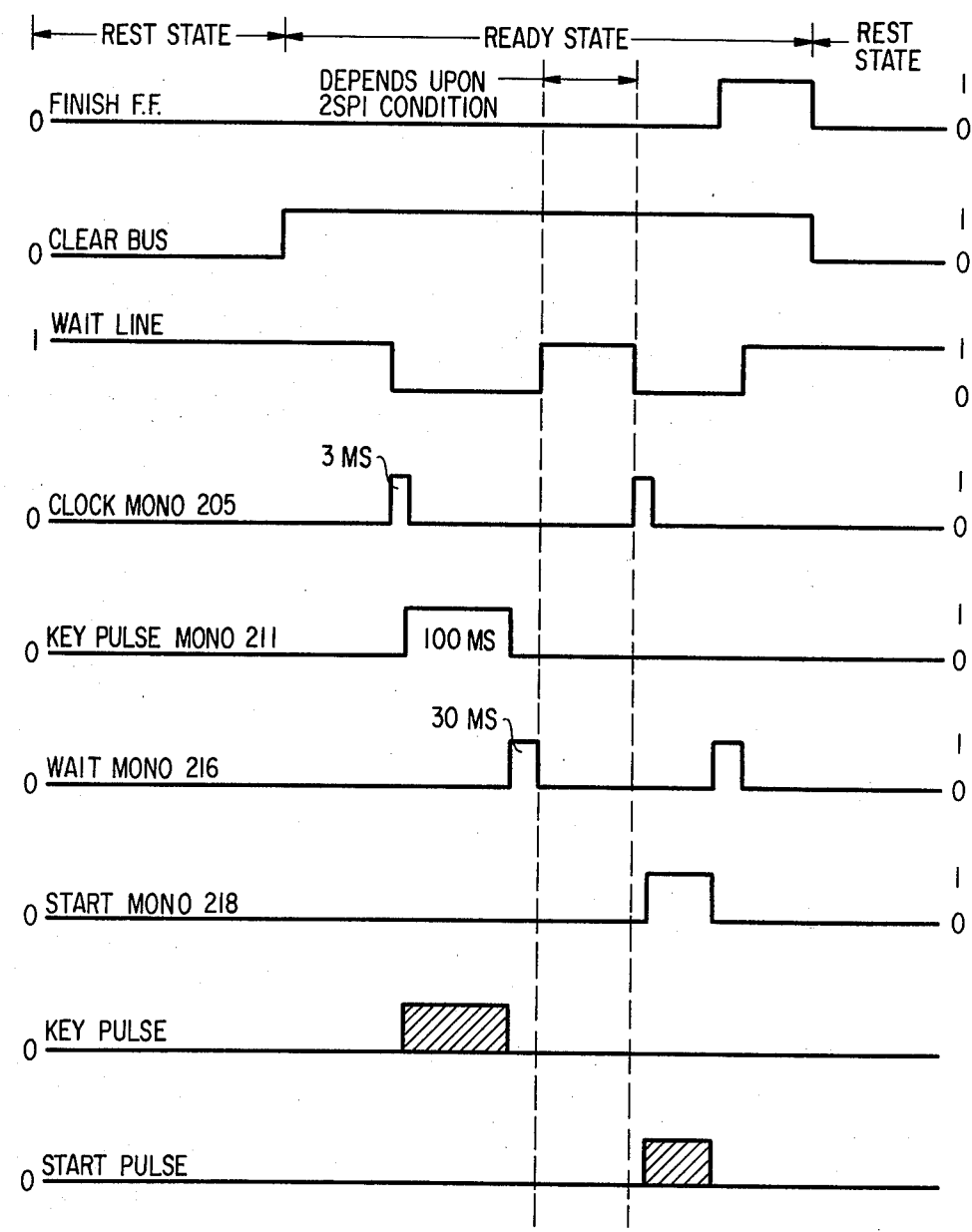
FIG. 5 shows a timing diagram of the outpulser shown in detail in FIG. 2.

The operation of a typical outpulser suitable for operation in the illustrative embodiment of the invention will now be described with respect to FIG. 2. The reader can also refer to the timing diagram of FIG. 5 which depicts the timing of various elements of the outpulser with respect to each other.

It will be recalled that relay 2RDY released to initialize outpulser 200 when automatic trunk test circuit 101 was activated. Relay 2RDY actuates its contact 2RDY-2, removing ground from the clear terminal of FINISH flip-flop 201 and connects ground to the lower input of READY NOR gate 202. With a low present on both inputs of NOR gate 202, gate 202 is enabled. The high output of NOR gate is inverted by inverter 203, presenting a low signal on the lower input of CLOCK NOR gate 204.

The other input to NOR gate 204 is controlled by contacts 2SP1-2 of relay 2SP1, and relay 2SP1 is operated by relay 1SP in multifrequency receiver 103 whenever the receiver is not detecting a tone from the blue box at the calling station. With NOR gate 204 disabled, the outpulser will be inhibited and remain inhibited until the multifrequency tone is removed by the calling line. As mentioned above, this assures that the tones sent by the outpulser are commingled with the tones sent by the blue box user, thus preventing the user from overriding the system by operating his blue box tone continuously.

When the blue box stops emitting a multifrequency tone, relay 1SP in receiver 103 operates, thereby releasing relay 2SP1 in the outpulser. When relay 2SP1 releases, the upper input to NOR gate 204 goes low, enabling gate 204.

When NOR gate 202 was disabled, a low signal was also transmitted over CLEAR BUS conductor 206 to clear START flip-flop 207 and KEY PULSE flip-flop 211 and also to preset WAIT flip-flop 208. When flip-flop 208 is preset, a high signal is present on WAIT LINE conductor 209 to one input of AND gate 210.

With conductor 209 in a high state and NOR gate 204 enabled, AND gate 210 is enabled to trigger CLOCK monopulser 205 which provides a 3 millisecond positive pulse on its Q output to the CLOCK terminal of KEY PULSE flip-flop 211. The Q output of monopulser 205 clears WAIT flip-flop 208, causing conductor 209 to go low, preventing the refiring of monopulser 205.

At the rising edge of the pulse on output Q of KEY PULSE flip-flop 211, KEY PULSE monopulser 212 is triggered to provide a 100 millisecond pulse which operates relay 2KP. Although the Q output of monopulser 205 is also connected to START flip-flop 207, flip-flop 207 is inhibited at this time by the low signal from the Q output of flip-flop 211 which is connected to the J input of flip-flop 207 over conductor 13.

The output pulse of monopulser 212 also enables NOR gate 214 to operate the 2SEND relay for approximately 100 milliseconds.

With both relays 2KP and 2SEND operated, the two frequencies 1100 HZ and 1700 HZ are coupled through transformer 215 and contacts 2SEND-1 and 2SEND-2 to the T2 and R2 conductors. The T2 and R2 conductors are connected to the called end of trunk 110 in FIG. 1 and the KEY PULSE tone is transmitted over the trunk to the terminating office for the 100 millisecond duration of monopulser 212.

The leading edge of the output pulse of enabled NOR gate 214 also triggers WAIT monopulser 216 over conductor 217. Monopulser 216 provides a high output for 30 milliseconds and at the end of this pulse, WAIT flip-flop 208 is set causing conductor 209 to go high, preparing CLOCK monopulser 205 for the next operation.

NOR gate 204 is still under control of contacts 2SP1-2 so that monopulser 205 cannot be retriggered until the outpulser is assured that multifrequency receiver 103 is not receiving tones from the blue box. This is indicated by a release of the signal present detection relay 2SP1. When relay 2SP1 releases enabling CLOCK NOR gate 204, CLOCK monopulser 205 is once again triggered.

When the output of CLOCK monopulser 205 goes low at the end of the 3 millisecond interval, KEY PULSE flip-flop 211 is reset and START flip-flop 207 is set. Flip-flop 207 triggers START monopulser 218, which provides a high output to actuate relays 2ST and 2SEND for 60 milliseconds. With both of these relays operated, the two frequencies 1500 HZ and 1700 HZ comprising a START PULSE are transmitted over the established connection to the terminating office.

The START PULSE is shut off at the end of the 60 millisecond interval determined by the START monopulser, and when conductor 219 goes low at the end of this pulse, FINISH flip-flop 201 is set. When flip-flop 201 is set, its $\overline{Q}$ goes high, operating relay 2FIN which grounds conductor 221 to processor 115, informing the processor that the outpulser has finished its function.

The Q output of flip-flop 201 also going high causes conductor 206 to go low and conductor 220 to go high. The low on conductor 206 clears both the KEY PULSE flip-flop 211 and the START flip-flop 207, and WAIT flip-flop 208 is preset. The high on conductor 220 prevents the recycling of CLOCK monopulser 205 until the next time READY relay 2RDY is released.

Processor 115 will now release automatic trunk test circuit 101, which causes relay 2RDY in outpulser 200 to operate. In operating, relay 2RDY clears flip-flop 201 and the outpulser is restored to normal.

Thus, from the above description it can be seen that an arrangement is provided for detecting a fraudulent call in progress and frustrating the completion of the call by mutilating the multifrequency tones transmitted by a fraud device. The signal is mutilated by commingling special tones with tones generated by the fraud device so that an invalid sequence of digits is transmitted to the terminating office. Recognizing the invalid digit sequence, the terminating office routes the call to reorder tone in a conventional manner.

It is to be understood that the above-described arrangements are merely illustrative of the application of the principles of the invention. Numerous other arrangements may be devised by those skilled in the art without departing from the spirit and scope of the invention. For example, instead of commingling KEY PULSE and START PULSE signals with signals generated by the blue box, the outpulser might transmit frequencies not in the group used in the standard signaling format. Additionally, the outpulser might transmit more than two-out-of-six frequencies to direct the call to reorder at the distant office.

We claim:

1. For use in a telephone system wherein called station address information is transmitted between switching offices using a first signaling format different from the signaling format generated by a calling station and wherein said calling station includes a fraud device for simulating said first signaling format in order to manipulate said switching offices to avoid toll charges,
    means for frustrating the completion of a call originated by said fraud device
    characterized by
    means at one of said offices responsive to said fraud device for mutilating the transmission of signals from said fraud device, said mutilating means comprising means for generating discrete signals and means for coupling said discrete signals with signals transmitted from said fraud device.

2. The invention set forth in claim 1 wherein
    said coupling means comprises means for monitoring signals transmitted by said fraud device and means for transmitting one of said discrete signals in the absence of a signal from said fraud device.

3. For use in a telephone system wherein called address information is transmitted between originating and destination switching offices using tone signaling differing from signals generated by calling customer stations,
    a fraud device for originating toll free calls from a customer station by simulating said switching office tone signaling to manipulate switching equipment at said destination switching office,
    means for monitoring tones emanating from said fraud device, and
    means for blocking the completion of a call originating from said fraud device
    characterized by
    means for transmitting to said destination office discrete tones along with said monitored tones to cause a fraudulent call to be misdirected from its intended destination.

4. The invention set forth in claim 3 wherein
    said transmitting means comprises means for detecting the absence of a tone from said fraud device and means controlled by said detecting means for generating one of a plurality of preselected tones for transmission to said destination office.

5. The invention set forth in claim 4 wherein
    said office signaling comprises a plurality of tone signals selectable to represent a particular called destination and wherein a selected plurality of tone signals are preceded and succeeded respectively by a first and a second signal distinguishable from said selectable signals and wherein said transmitting means is
    characterized by
    means for generating an additional one of said first signals during the transmission of said selectable signals simulated by said fraud device.

6. In a telephone system wherein called address signals generated by a calling station are automatically converted by a near-end office into corresponding switching signals for directing a far-end office to establish a connection to a first called line identified by said address signals and wherein
    a fraud device is controlled at said calling station for generating a second set of switching signals for transmittal to said far-end office in order to direct a connection to a second called line,
    means for blocking the establishment of said connection to said second line
    characterized by
    means for altering the switching signals transmitted from said fraud device to said far-end office to direct the call to a third line.

7. The invention set forth in claim 6 wherein
    said altering means comprises means for generating preselected signals,
    means for monitoring switching signals generated by said fraud device, and means controlled by said monitoring means for transmitting said preselected signals to said far-end office.

8. The invention set forth in claim 7 wherein said monitoring means comprises detector means responsive to a switching signal from said fraud device, wherein said generating means comprises a plurality of tone oscillators, and wherein said transmitting means comprises means controlled by said detector means for selectively coupling different ones of said oscillators to an interoffice trunk between the near-end and far-end offices.

9. The invention set forth in claim 7 wherein said telephone system also comprises means for ascertaining the presence of said fraud device at said calling station, wherein said switching signals comprise a plurality of multifrequency tones, wherein said blocking means comprises means for connecting a multifrequency tone receiver to an interoffice trunk, and wherein said transmitting means comprises an outpulser circuit having a plurality of tone generating means and means for coupling said tone generating means to said trunk under control of said receiver.

10. The invention set forth in claim 9 wherein said coupling means comprises a plurality of means each effective when actuated for individually connecting one of said tone generating means to said trunk, and wherein said outpulser circuit also comprises means for timing the actuation of said connecting means and means controlled by said timing means for signalling said ascertaining means after all said connecting means have been actuated.

11. In a telephone system wherein each customer station is identified by an address comprising a corresponding ordered sequence of digits, wherein the digit sequence corresponding to a first called station address is transmitted from a calling switching office to a called switching office by a first ordered sequence of switching signals generated by the calling office in response to dialing signals generated by a calling station, wherein a calling station can avoid calling office toll charges by utilizing a fraud device to generate for direct transmission to said called office a second ordered sequence of switching signals representing a second called station, and wherein means is provided for detecting the usage of said fraud device, a method of frustrating a fraud call originated by said fraud device and addressed to said second called station comprising the steps of monitoring the ordered sequence of switching signals generated by said fraud device, and transmitting to said called office a new ordered sequence of switching signals other than said monitored sequence.

12. The method set forth in claim 11 wherein the steps of monitoring the switching signals comprises the step of detecting each switching signal transmitted by said fraud device, and wherein the step of transmitting the new ordered sequence comprises the steps of generating a special switching signal unrelated to a called station address and forwarding the special signal to the called office in the absence of a switching signal from said fraud device.

13. The method set forth in claim 11 wherein each said sequence of switching signals comprises a plurality of first signals selectively ordered in a distinct sequence representing a corresponding called station address and a control signal appended thereto, and wherein the step of transmitting a new ordered sequence comprises the step of interjecting a control signal in the ordered sequence of first signals which represent a called station.

14. Equipment for frustrating a fraudulent toll call initiated by a station utilizing a blue box device, said equipment comprising a multifrequency receiver for detecting the presence of digit signals transmitted over call connections from said device, means for signaling the absence of said digit signals and a tone generator, characterized by means responsive to said receiver for causing said generator to commingle on said call connections KEY PULSE and START PULSE signals with said digit signals to divert the call thereon to reorder.

* * * * *